United States Patent
Kumakawa et al.

(10) Patent No.: US 7,320,493 B2
(45) Date of Patent: Jan. 22, 2008

(54) SUN VISOR

(75) Inventors: Yasushi Kumakawa, Kanagawa (JP); Yoshiaki Enma, Kanagawa (JP)

(73) Assignees: Piolax, Inc., Yokohama-shi, Kanagawa (JP); Kasai Kogyo Co., Ltd., Kouza-gun, Kanagawa (JP)

( * ) Notice: Subject to any disclaimer, the term of this patent is extended or adjusted under 35 U.S.C. 154(b) by 56 days.

(21) Appl. No.: 11/246,305

(22) Filed: Oct. 11, 2005

(65) Prior Publication Data

US 2006/0076796 A1    Apr. 13, 2006

(30) Foreign Application Priority Data

Oct. 12, 2004    (JP) .......................... P2004-298182

(51) Int. Cl.
*B60J 3/02*    (2006.01)

(52) U.S. Cl. .................................. 296/97.8; 296/97.11

(58) Field of Classification Search ............. 296/97.11, 296/97.8
See application file for complete search history.

(56) References Cited

U.S. PATENT DOCUMENTS 4,989,910 A * 2/1991 Mersman et al. .......... 296/97.4
5,855,405 A * 1/1999 Robles ...................... 296/97.4
6,488,328 B2 * 12/2002 Quapil ....................... 296/97.8

FOREIGN PATENT DOCUMENTS

| GB | 214394 A | 1/1985 |
| JP | 2003-165332 | * 6/2003 |
| JP | 2004-050940 | 2/2004 |

OTHER PUBLICATIONS

United Kingdom Search Repoert dated Jan. 13, 2006.

* cited by examiner

*Primary Examiner*—Dennis H. Pedder
(74) *Attorney, Agent, or Firm*—McGinn IP Law Group, PLLC

(57) ABSTRACT

A sun visor includes a sun-visor body, an auxiliary visor, a sub-plate and a spring. The auxiliary visor is attached to the sun-visor body slidably. The sub-plate is attached to the auxiliary visor to slide between a first position where the auxiliary visor receives the sub-plate and a second position where the sub-plate is withdrawn from the auxiliary visor. The spring urges the sub-plate toward the second position. The spring includes a base and two arm portions continuous to the base. The center portion of a spring wire forms the base of the spring. The two arm portions are bent to cross each other. A center portion of the base is convex toward an intersection of the two arm portions. The base abuts against one of the auxiliary visor and the sub-plate. The two arm portions abut against the other to urge the other elastically.

10 Claims, 10 Drawing Sheets

SUN VISOR

BACKGROUND OF THE INVENTION

1. Field of the Invention

The invention relates to a sun visor, which is mounted at a position being obliquely upward with respect to a driver's seat and/or a passenger seat of a vehicle, and particularly, to a sun visor having a sub-plate in order to enlarge a light-shielding area.

2. Description of the Related Art

A sun visor is mounted at a position being obliquely upward with respect to a driver's seat and/or a passenger seat of a vehicle in order to shield sunlight or light coming from headlights of an oncoming vehicle at night. The sun visor is pivotably attached to a vehicle body or the like through a support member. Depending on a direction of light entering through windows, the sun visor is placed ahead when shielding light entering through a front window; and aside when shielding sunlight entering through a side window.

However, when the sun visor shields sunlight entering through the side window, light cannot be shielded satisfactorily even though the sun visor is placed aside. This is because the sun visor is not long enough to shield a driver or passenger from the light.

Therefore, JP 2004-50940 A discloses a sun visor including a sun-visor body, a slide plate, and a sub-plate. The sun-visor body defines a housing recess portion. The slide plate is received in the housing recess portion so that the slide plate can be withdrawn therefrom. The sub-plate is overlapped on one surface of the slide plate. The sub-plate is supported pivotally while being urged by spring so as to protrude from an upper edge of the slide plate. When the slide plate is withdrawn from the housing recess portion, the sub-plate rotates and protrudes from the upper edge of the slide plate.

SUMMARY OF THE INVENTION

However, the sun visor of JP 2004-50940 A uses a helical torsion coil spring or a compression coil spring to urge the sub-plate as means for spring-urging the sub-plate. Therefore, it is necessary that a long wire be shaped like a helical torsion coil spring or a compression coil spring in order to withdraw the slide plate automatically in response to a user's operation. As a result, there arises a problem that the thickness, size and weight of the sun visor increase, and rattling easily occurs.

The invention provides a sun visor, which can shield sunlight entering though a side window, and is compact and lightweight.

According to a first aspect of the invention, a sun visor is mounted at a position being obliquely upward with respect to a driver's seat or a passenger seat of a vehicle. The sun visor includes a sun-visor body, an auxiliary visor, a sub-plate and a spring. The sun-visor body is pivotably supported by a vehicle body through a support member. The auxiliary visor is attached to the sun-visor body slidably. The sub-plate is attached to the auxiliary visor to slide between a first position where the auxiliary visor receives the sub-plate and a second position where the sub-plate is withdrawn from the auxiliary visor. The spring urges the sub-plate toward the second position. The spring includes a base and two arm portions continuous to the base. The spring is formed of a spring wire. The center portion of the spring wire forms the base of the spring. The two arm portions are bent to cross each other. A center portion of the base protrudes toward an intersection of the two arm portions. The base of the spring abut against one of the auxiliary visor and the sub-plate. The two arm portions of the spring abut against the other of the auxiliary visor and the sub-plate to urge the other elastically.

According to a second aspect of the invention, a sun visor is mounted at a position being obliquely upward with respect to a driver's seat or a passenger seat of a vehicle. The sun visor includes a sun-visor body, an auxiliary visor, a sub-plate and a spring. The sun-visor body is pivotably supported by a vehicle body through a support member. The auxiliary visor is attached to the sun-visor body slidably. The sub-plate is attached to the auxiliary visor to slide between a first position where the auxiliary visor receives the sub-plate and a second position where the sub-plate is withdrawn from the auxiliary visor. The spring urges the sub-plate toward the second position. The spring includes a base and two arm portions continuous to the base. The spring is formed of a spring wire. A center portion of the spring wire forms the base of the spring. The two arm portions are folded back toward the center portion of the spring wire, extends a predetermined distance along the base and then extends obliquely with respect to the base to cross each other. The base of the spring abuts against one of the auxiliary visor and the sub-plate. The two arm portions of the spring abut against the other of the auxiliary visor and the sub-plate to urge the other elastically.

A tip end of each of the two arm portions of the spring may be bent in a circular-arc shape protruding away from the base.

Also, the auxiliary visor may define a holding groove, with which the spring engages, at a portion where the spring abuts against the auxiliary visor. The sub-plate may define a holding groove, with which the spring engages, at a portion where the spring abuts against the sub-plate.

Also, the auxiliary visor may be attached to the sun-visor body so that the auxiliary Visor can be withdrawn from one side of the sun-visor body in a withdrawing direction. When the auxiliary visor is withdrawn from the sun-visor body, the sub-plate may be pushed out of the auxiliary visor in a direction substantially perpendicular to the withdrawing direction due to an urging force by the spring.

According to the structures described above, the light-shielding area can be increased by withdrawing the sub-plate from the auxiliary visor or the sun-visor body. Therefore, the sun visor can shield sunlight entering through the side window effectively.

In addition, the spring urges the sub-plate toward the second position, the center portion of the spring wire forms the base of the spring and the two arm portions are bent to cross each other. Therefore, the spring can be received in small gap between the auxiliary visor and the sub-plate. Also, the unfolded length of the spring wire can be increased to increase flexibility, and the two arm portions crossing each other may urge the sub-plate at two points. Therefore, the sub-plate can be withdrawn smoothly.

Furthermore, in the case where the center portion of the spring wire forms the base of the spring, the two arm portions are bent to cross each other and the center portion of the base protrudes toward an intersection of the two arm portions, both ends of the base serve as fulcrums. Even if the spring is compressed, the both ends of the base don't move up or the center portion of the base doesn't serve as a fulcrum. On the other hand, the two arm portion crossing each other is kept abutting against the counterpart member, so that it is prevented that a point of action moves to the intersection. As a result, the two arm portions can give an elastic force from the beginning of the withdrawing operation of the sub-plate to the end of the withdrawing operation of the sub-plate.

Furthermore, in the case where the center portion of the spring wire forms the base of the spring and the two arm portions are folded back toward the center portion of the spring wire, extends a predetermined distance along the base and then extends obliquely with respect to the base to cross each other, the length of the two arm portions can be lengthen by the length of the spring wire folded back and diverted. Thereby, the flexibility of the spring can be enhanced. Also, since the angle between the two arm portions and the base of the spring (or a virtual line parallel to holding groove of the auxiliary visor or the sub-plate) can be made large, it can be prevented that intermediate portions of the two arm portions come into contact with the other of the auxiliary visor and the sub-plate depending on a flexure state of the spring and that the fulcrums get close to each other. As a result, flexibility of the spring can be maintained.

BRIEF DESCRIPTION OF THE DRAWINGS

FIG. 2 shows an auxiliary visor of the sun visor.

FIG. 3 shows a sub-plate of the sun visor.

DETAILED DESCRIPTION OF THE EMBODIMENTS OF THE INVENTION

Hereinafter, an embodiment of a sun visor according to the invention will be described with reference to the accompanying drawings.

Figure 9:
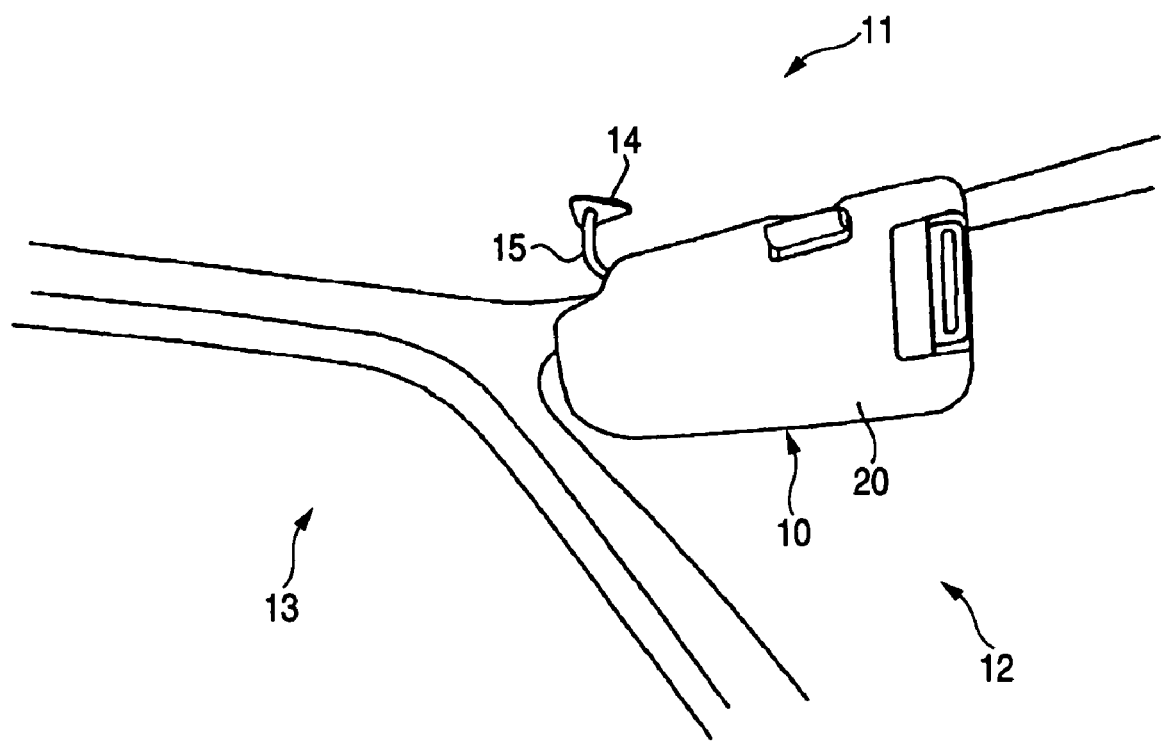
FIG. 9 is an explanatory view showing the sun visor, which is attached to a vehicle and shields light entering through a front window.

As shown in FIG. 9, a sun visor 10 is mounted to a front end of a vehicle ceiling 11, which is located at a position obliquely upward with respect to the driver's seat and/or passenger's seat through a fixing seat 14 and a support member 15. The embodiment illustrates the sun visor attached at a passenger's seat (in a vehicle with a right-hand steering wheel).

A front window 12 is disposed in front of the sun visor 10, and a side window 13 is disposed beside the sun visor 10. The sun visor 10 can pivot clockwise and counterclockwise, and rotate upward and downward through the support member 15.

Figure 1:
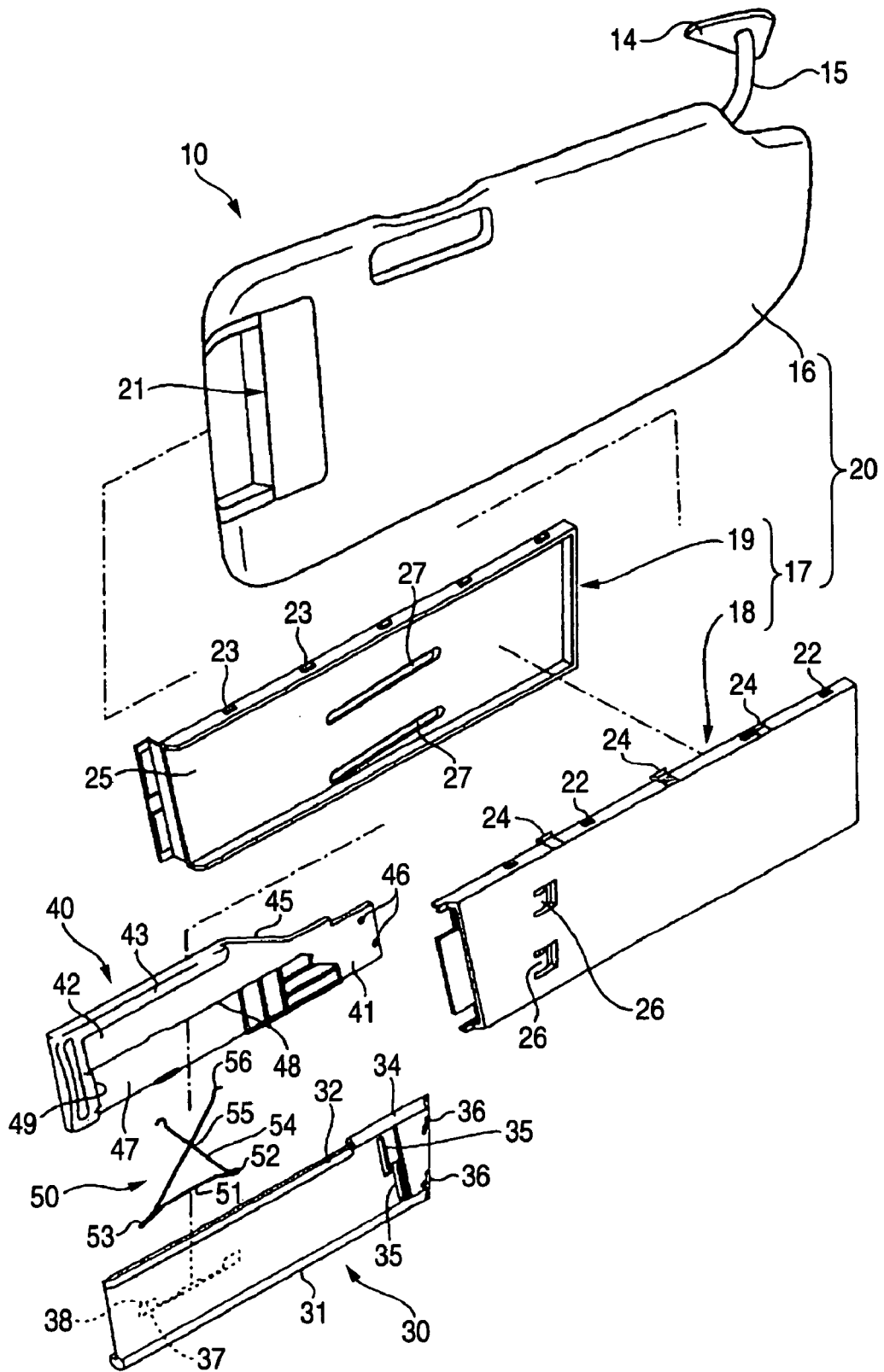
FIG. 1 is an exploded perspective view showing a sun visor according to an embodiment of the invention.

As shown in FIG. 1, the sun visor 10 has a sun-visor body 20, which is supported by the support member 15. The sun-visor body 20 includes a cover 16 and a casing 17.

The cover 16 includes a recess, in which the casing 17 is received, at a center portion of a core material (not shown). When the casing is received, an exterior material such as cross covers the outside of the core material. The cover 16 is shaped like a long and thin plate and has a slit-shaped opening 21 at one end.

The casing 17 is shaped like a long and thin plate, which is received inside the cover 16. The casing 17 includes an outer casing 18 and an inner casing 19.

A plurality of engaging holes 22 are formed at given intervals on the peripheral wall of the outer casing 18. In addition, cover-engaging claws 24, which engage with the core material of the cover 16, protrude from the peripheral wall. Engaging claws 23, which engage with the engaging holes 22 of the outer casing 18, protrude from the peripheral wall of the inner casing 19. The inner casing 19 is inserted into the outer casing 18. The engaging claws 23 engage with the engaging holes 22 of the outer casing 18, so that the inner casing 19 is assembled into the outer casing 18. Then, the outer casing 18 and the inner casing 19 form the casing 17, which is formed in a thin plate-shaped box.

An opening 25 is formed at an end of the casing 17. A pair of elastic engaging pieces 26, which are formed by inverse C-shaped grooves, are formed at locations close to the opening 25 on the outer casing 18. The elastic engaging pieces 26 are formed into a tang-piece shape, which curve toward the inside of the outer casing 18. A pair of protrusions 27, which are formed slightly inclined to the longitudinal direction of the inner casing 19, are provided at the inside surface of the inner casing 19. The casing 17 receives an assembly of an auxiliary visor 30, a sub-plate 40 and a spring 50, which can be withdrawn through the opening 25.

Figure 2A:
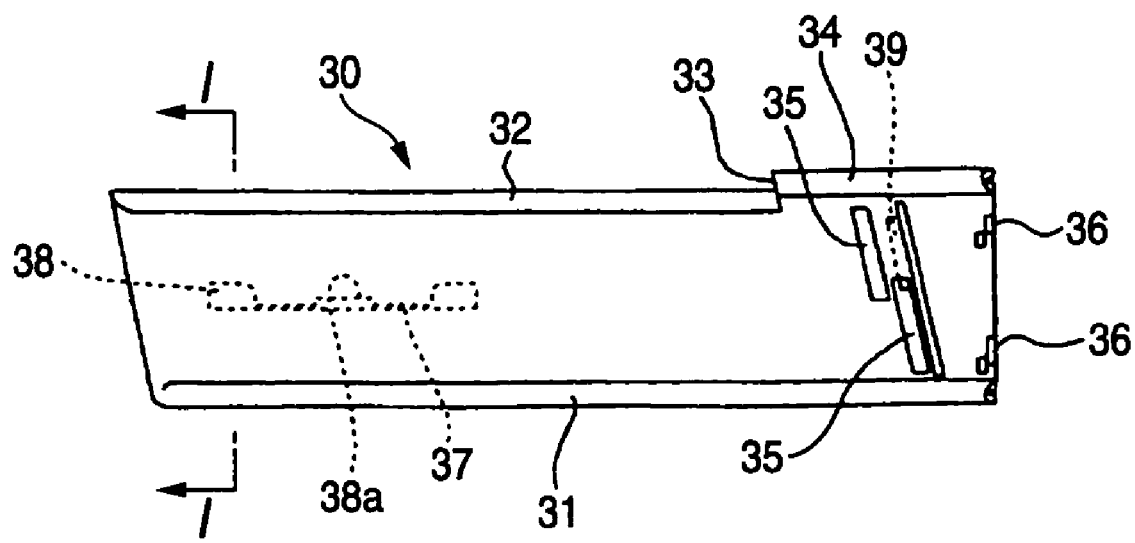
FIG. 2A is a front view.
Figure 2B:
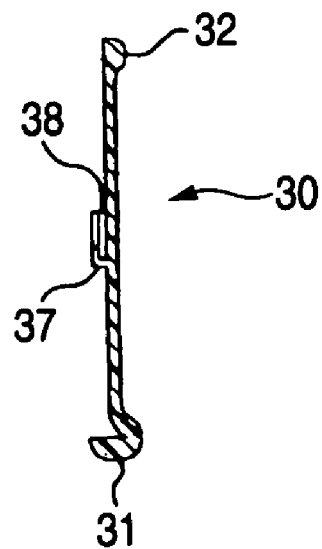
FIG. 2B is a section view taken along the line I-I in FIG. 2A.

Referring to FIG. 2, the auxiliary visor 30 forms an almost rectangular plate, which fits into the inner periphery of the casing 17. The auxiliary visor 30 has ribs 31 and 32 formed at both side edges along the longitudinal direction of the auxiliary visor 30. Also, the auxiliary visor 30 has a large-width portion on the rear-end side of the rib 32 through a step portion 33. A rib 34 is provided at a side edge of the large-width portion as well. A pair of guide holes 35 is formed along the width direction at the base end of the auxiliary visor 30. In addition, a guide 39, which sandwiches the base end of the sub-plate 40 (described later), is formed substantially parallel to the guide holes 35 at the further base end of the auxiliary visor 30. Furthermore, a pair of stopper claws 36 protrudes from the rear edge of the auxiliary visor 30. The stopper claws 36 engage with the elastic engaging pieces 26 of the outer casing 18 so as to prevent the auxiliary visor 30 from detaching from the casing 17. A receiving portion 37, which extends in the longitudinal direction of the auxiliary visor 30, is formed at a position slightly off the center portion of the auxiliary visor in the protruding direction. The receiving portion 37 is at an intermediate portion of the auxiliary visor 30 in the width direction and extends in the length direction. Base-retention grooves 38, which are formed by ribs extending parallel to the surface of the auxiliary visor 30, are provided at both ends of the receiving portion 37. Bent portions 52 of a base 51 of a spring 50, described later, engage with the base-retention grooves 38.

Figure 3A:
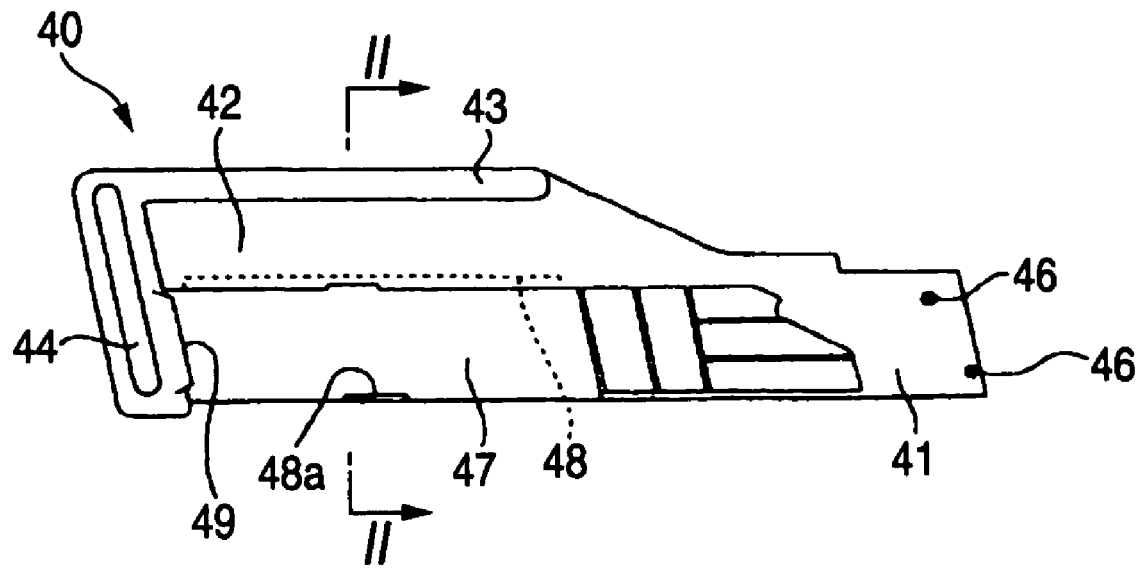
FIG. 3A is a front view.
Figure 3B:
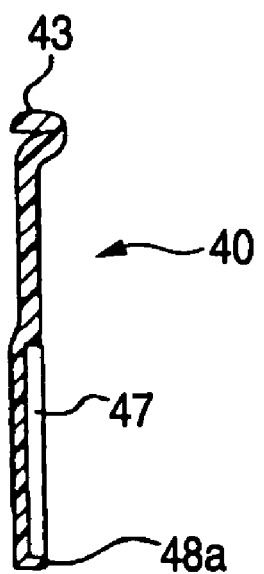
FIG. 3B is a section view taken along the line II-II in FIG. 3A.

Referring to FIG. 3, the sub-plate 40 is narrow at the rear end 41 and wide at the front end 42. In addition, a taper portion 45 is formed on an edge of the sub-plate 40 at a transition portion from the narrow rear end 41 to the wide front end 42. A rib 43 is formed at one edge of the front end 42. Furthermore, a gripper 44 is provided at the front end of the sub-plate 40. A spring-housing recess 47, which receives the spring 50, is formed from the center portion of the wide front end 42 in the width direction toward an edge opposite to the rib 43. An arm retention groove 48, which is engaged with arm portions 54 of the spring 50, is formed at the upper edge of the spring-housing recess 47. Also, a stopper rib 48a, which engages with the engaging rib 38a of the auxiliary visor 30 so as to restrict the maximum sliding position of the sub-plate 40, is provided at the center portion of the lower edge of the spring-housing recess 47.

A guide 49, which sandwiches the edge of the auxiliary visor 30, is provided close to the gripper 44 in the spring-housing recess 47. In addition, a plurality of protrusions 46, which is inserted into the guide holes 35 of the auxiliary visor 30, is formed at the base end of the sub-plate 40. Therefore, the sub-plate 40 is mounted on the auxiliary visor 30 and can slide substantially perpendicular to the longitudinal direction (to be exact, slightly inclined) of the auxiliary visor 30 when the protrusions 46 at the base end of the sub-plate 40 are inserted into the guide 39 of the auxiliary visor 30 and the front edge of the auxiliary visor 30 inserted into the guide 49 of the sub-plate 40.

As described above, the auxiliary visor 30 and the sub-plate 40 are received in the casing 17 and can be withdrawn out through the opening 25 of the casing 17. In addition, as described above, the elastic engaging pieces 26 of the casing 17 are engaged with the stopper claws 36 of the auxiliary visor 30 to prevent the auxiliary visor 30 from being detached from the casing 17. Furthermore, the protrusions 27 provided at the inner casing 19 press the sub-plate 40 and the auxiliary visor 30 toward the outer casing 18 so as to prevent rattling in the casing 17.

Figure 4:
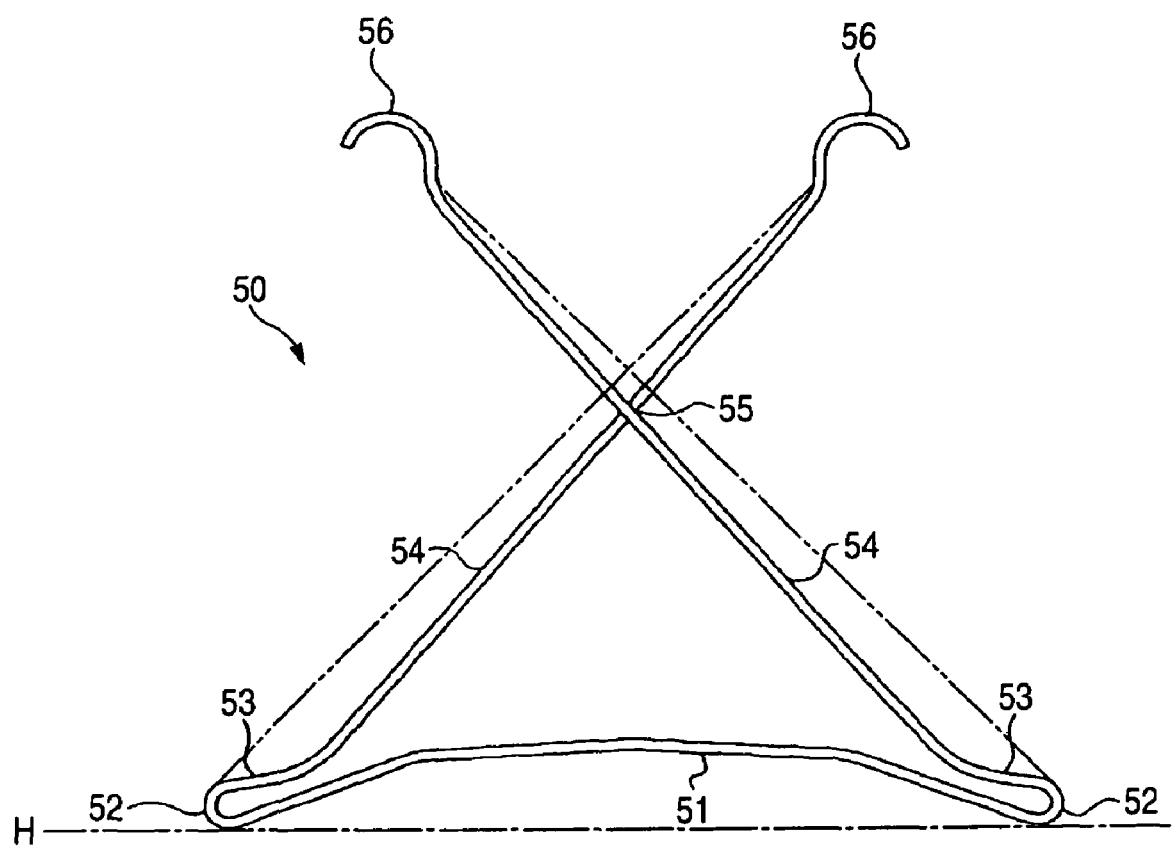
FIG. 4 is a front view showing a spring used in the sun visor.

The spring 50 is formed by bending a metallic spring wire. That is, as shown in FIG. 4, the spring 50 is configured so that the center portion of the spring wire forms a base 51; that the arm portions 54 are continuous to the base 51 and bent at bent portions 52 so as to extend obliquely upward; and that intermediate portions of the arm portions 54 form an intersection portion 55 where the arm portions 54 cross each other. In this embodiment, the base 51 is convex toward the intersection portion 55. In addition, the bent portion 52 includes a folded portion 53 at which the spring wire extends along the base 51 a predetermined length and then extends obliquely upward. Furthermore, circular-arc shaped bent portions 56, which are convex away from the base 51, are formed at both ends of the spring 50.

The spring 50 is interposed between the auxiliary visor 30 and the sub-plate 40 and mounted in the spring-housing recess 47 by inserting the bent portions 52 of the base 51 into the base retention grooves 38 of the auxiliary visor 30 and inserting the circular-arc shaped bent portions 56 of the arms portions 54 into the arm-portion retention groove 48 of the sub-plate 40. As a result, the sub-plate 40 is always elastically urged and pushed substantially perpendicular to the longitudinal direction of the auxiliary visor 30 by the spring 50.

Next, the operation of the sun visor according to this embodiment will be described.

As shown in FIG. 9, the sun visor 10 is placed at the top of the front window 12 when sunlight or light coming from an oncoming vehicle enters through the front window 12. In this case, the sun visor 10 shields light satisfactory only with the sun-visor body 20. Therefore, it is not necessary to withdraw the auxiliary visor 30.

Figure 10:
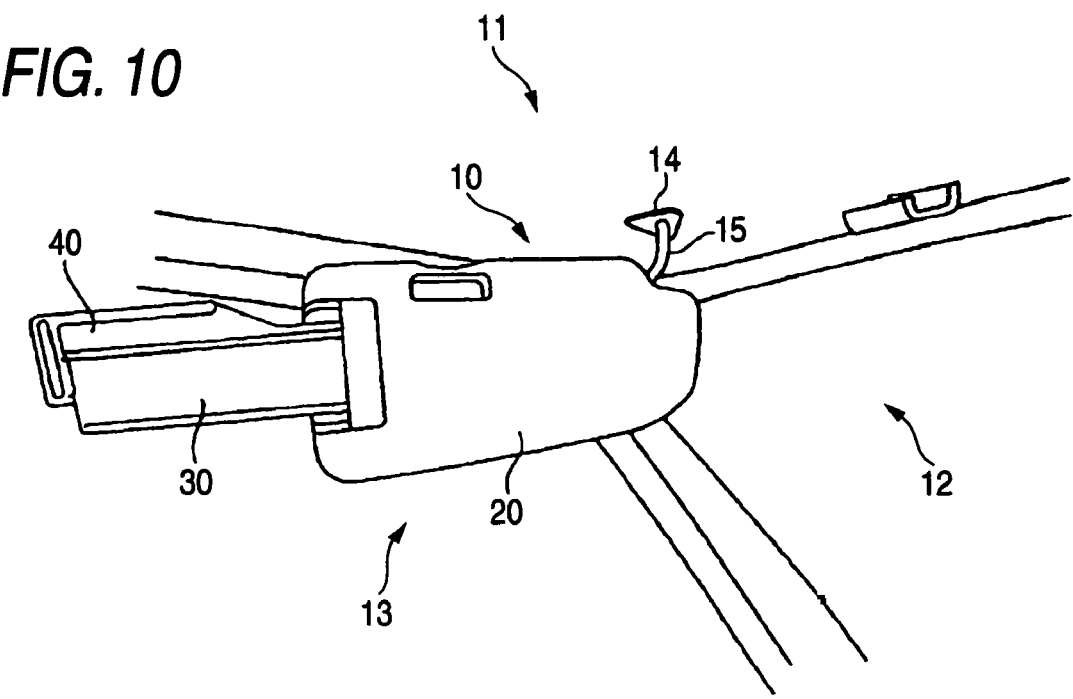
FIG. 10 is an explanatory view showing the sun visor, which shields light entering through a side window.

On the other hand, when sunlight enters through the side window 13, the sun visor 10 is turned to the side window 13 through the support member 15, as shown in FIG. 10. However, the sun visor 10 often cannot shield sunlight entering through the side window 13 satisfactorily. This is because a driver or passenger often places his/her head at the rear of the side window. At a time like this, a user grips the gripper 44 the sub-plate 40 and withdraws the sub-plate 40 and the auxiliary visor 30 from the sun-visor body 20.

In this case, when the taper portion 45 of the sub-plate 40 reaches the opening 25 of the casing 17, the sub-plate 40 is gradually pushed away in the direction substantially perpendicular to the longitudinal direction of the auxiliary visor 30 due to the urging force of the spring 50. As a result, the auxiliary visor 30 lengthens the length of the sun visor 10, and the sub-plate 40 lengthens the width of the sun visor 10. As a result, the sun visor 10 can shield sunlight entering through the side window 13 effectively.

Meanwhile, when the sub-plate 40 and the auxiliary visor 30 are pushed into the casing 17, the taper portion 45 of the sub-plate 40 reaches the upper edge of the opening 25 of the casing 17, and then the sub-plate 40 gets into the auxiliary visor 30 along the taper portion 45 against the urging force of the spring 50. As a result, the sub-plate 40 and the auxiliary visor 30 are received in the casing 17.

Figure 5:
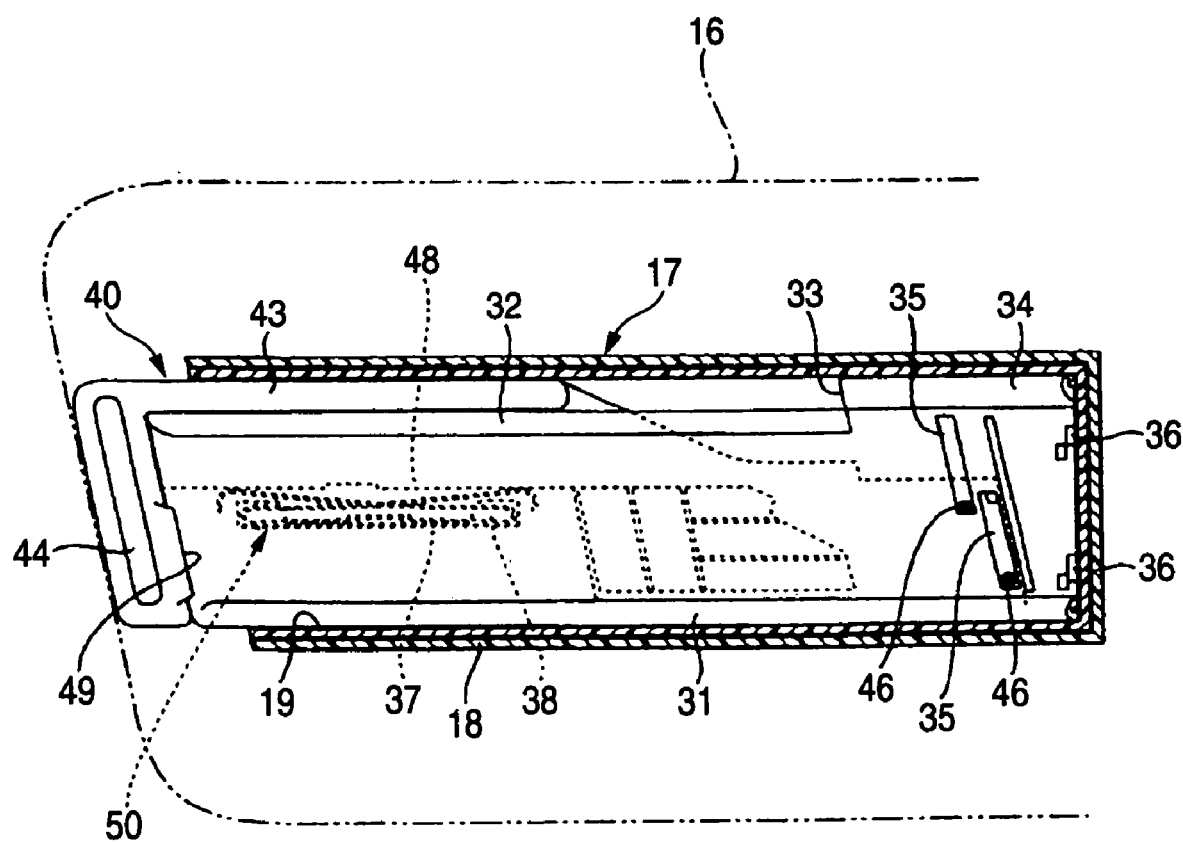
FIG. 5 is a section view showing the auxiliary visor and the sub-plate received in a sun-visor body of the sun visor.

FIG. 5 shows the sub-plate 40 and the auxiliary visor 30 received in the casing 17. The spring 50 is compressed between the sub-plate 40 and the auxiliary visor 30, the bent portions 52 of the base 51 is inserted into the base retention grooves 38 of the auxiliary visor 30 and the circular arc-shaped bent portions 56 of the arm portions 54 are inserted into the arm retention groove 48 of the sub-plate 40.

Figure 6:
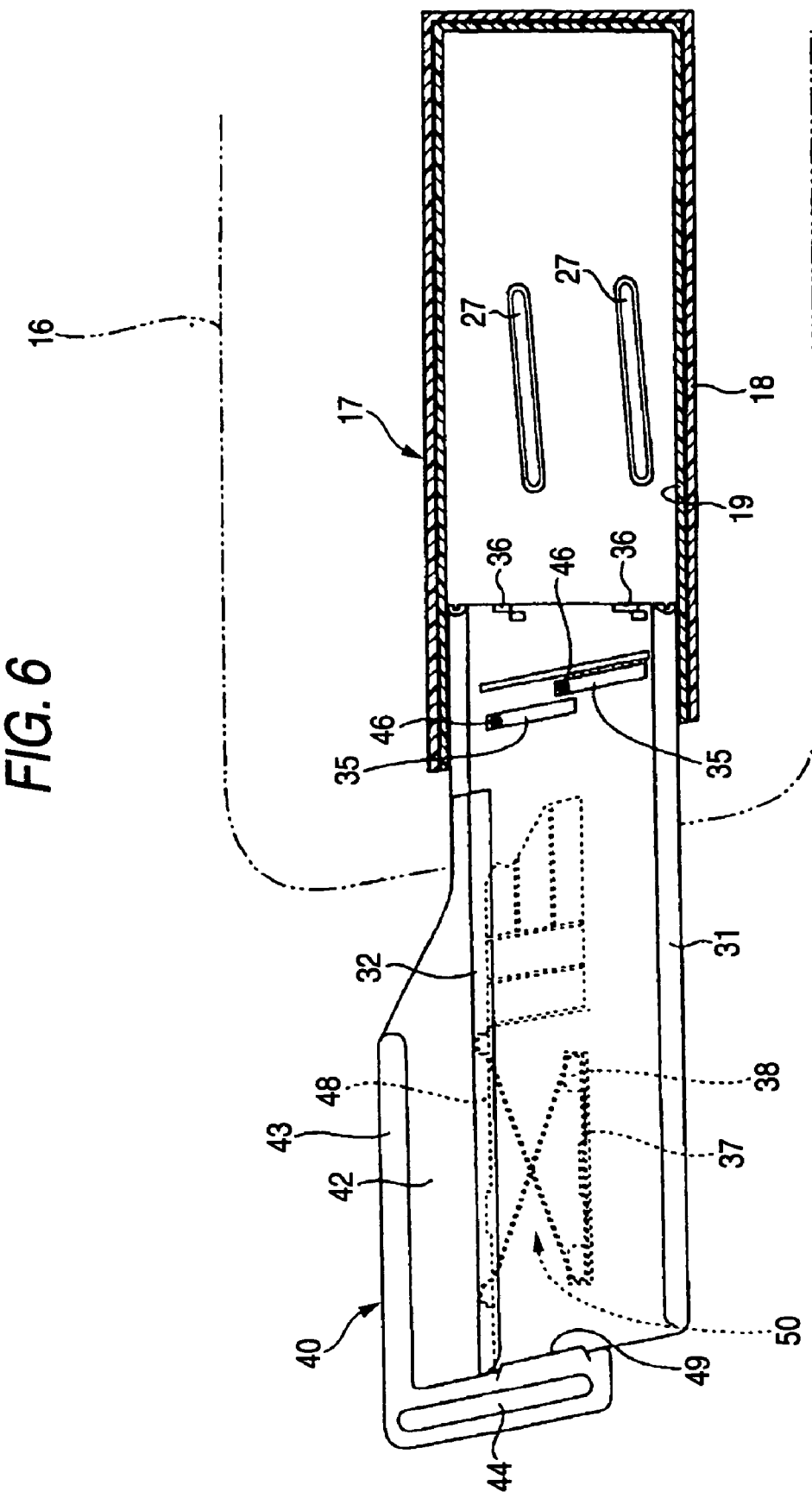
FIG. 6 is a section view showing the auxiliary visor and the sub-plate withdrawn from the sun-visor body of the sun visor.

FIG. 6 shows the auxiliary visor 30 and the sub-plate 40 withdrawn from the sun-visor body 20. As described above, the sub-plate 40 is pushed away from the auxiliary visor 30 in the direction substantially perpendicular to the longitudinal direction of the auxiliary visor 30 due to the urging force of the spring 50. As a result, the arm portions 54 rise, and the spring 50 stretches out.

Figure 7:
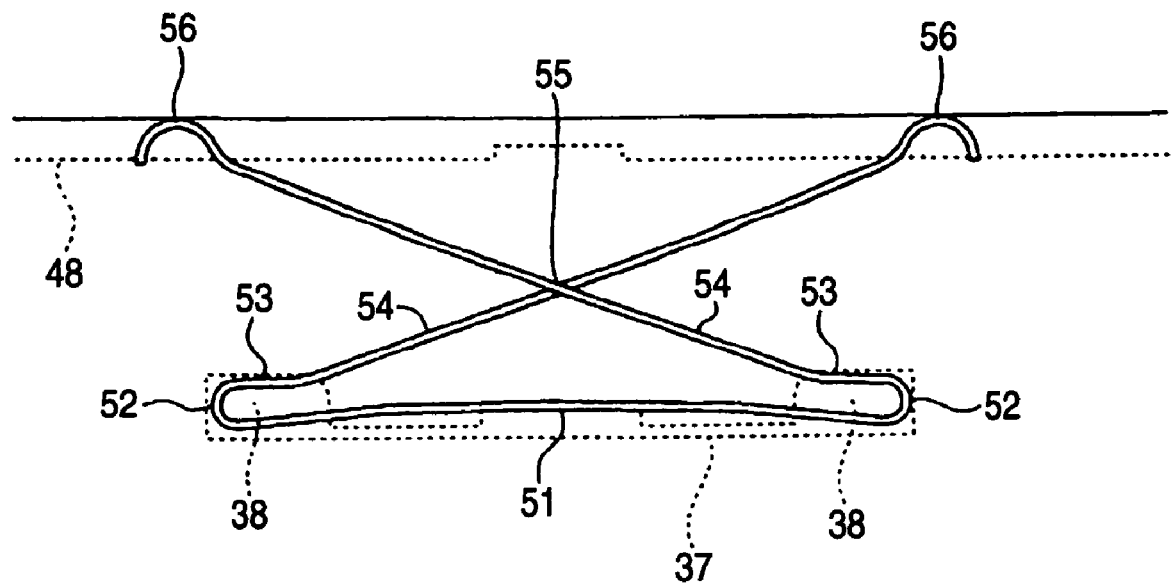
FIG. 7 is an explanatory view showing a spring when the sub-plate is withdrawn from the auxiliary visor in the sun visor.

FIG. 7 shows the shape of the spring 50 when the auxiliary visor 30 and the sub-plate 40 are withdrawn and the sub-plate 40 is pushed away from the auxiliary visor 30 by the urging force of the spring 50. The bent portions 52 at both end portions of the base 51 are inserted into the base retention grooves 38, the circular arc-shaped bent portions 56 at the front ends of the arm portions 54 are inserted into the arm retention groove 48, and the arm portions 54 cross each other crosswise. Since the center portion of the base 51 is convex toward the intersection portion 55, the base 51 touches the base retention grooves 58 only at the bent portions 52, not at the center portion thereof. Similarly, the arm portions 54 touch the arm retention groove 48 at the circular arc-shaped bent portions 56. In this case, since the arm portions 54 extend the predetermined length along the base 51 from the bent portions 52 and then extend obliquely upward, the arm portions 54 can rise at a larger angle with respect to the base 51 (or horizontal line H shown in FIG. 4) than chain-double dashed lines shown in FIG. 4. It is noted that each chain-double dashed line connects the bent portion 52 and a base portion of the circular arc-shaped bent portions 56 directly, without the folded portion 53. Furthermore, since the length of the arm portions 54 can be increased, the flexibility of the spring 50 improves.

Figure 8:
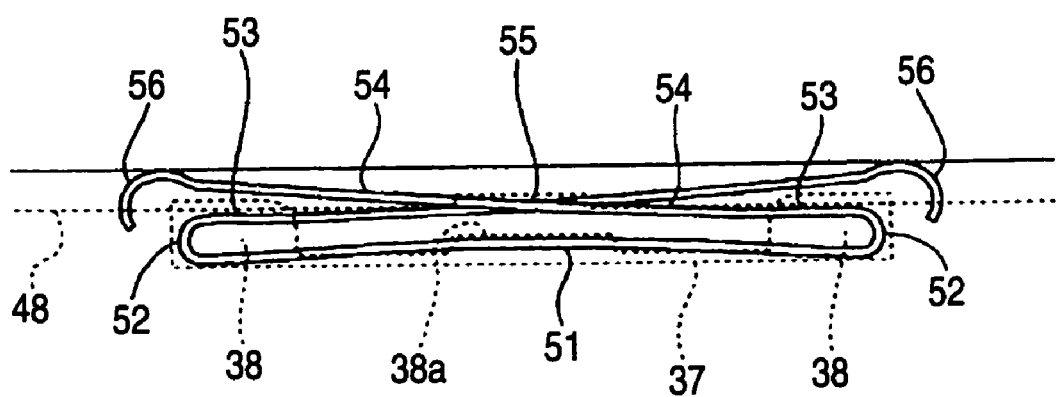
FIG. 8 is an explanatory view showing the spring when the sub-plate is pushed into the auxiliary visor in the sun visor.

FIG. 8 shows the shape of the compressed spring 50 when the auxiliary visor 30 and the sub-plate 40 are pushed into the sun-visor body 20. Like FIG. 7, since the center portion of the base 51 of the spring 50 is convex toward the intersection portion 55, the base 51 touches the base retention grooves 38 only at the bent portions 52, not at the center portion thereof. In addition, since the arm portions 54 extend obliquely upward from the bent portions 52 through the folded portions 53, the arm portions 54 touch the arm retention groove 48 only at the circular arc-shaped bent portions 56 even when the spring 50 is in the compression state. For example, the intersection portion 55 between the two arm portions 54 does not contact with the arm retention groove 48 even when the spring 50 is in the compression state as shown in FIG. 8. As a result, fulcrums and acting points of the spring 50 do not change even when the spring 50 is compressed. Therefore, elastic urging force is given smoothly in the entire range where the sub-plate 40 slides on the auxiliary visor 30.

Figure 11:
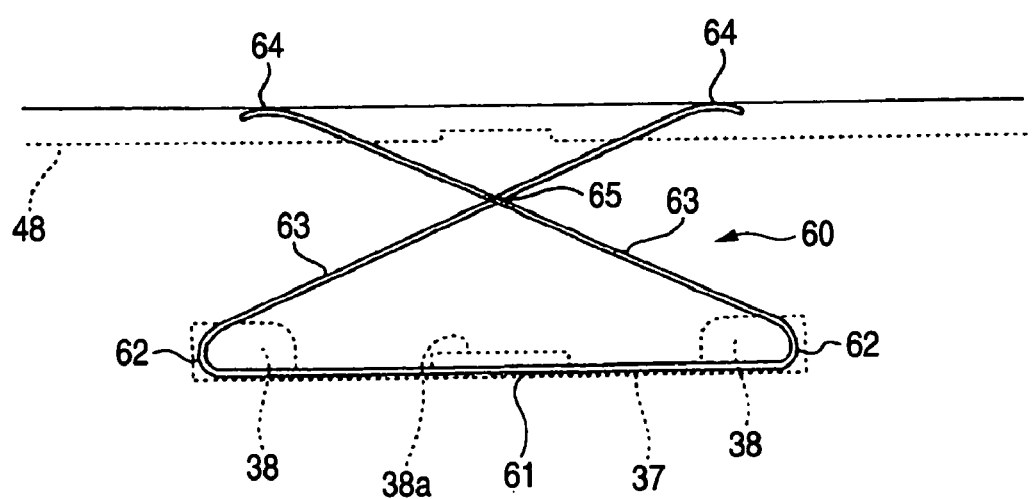
FIG. 11 is an explanatory view showing a spring of a comparative example when the sub-plate is withdrawn from the auxiliary visor.
Figure 12:
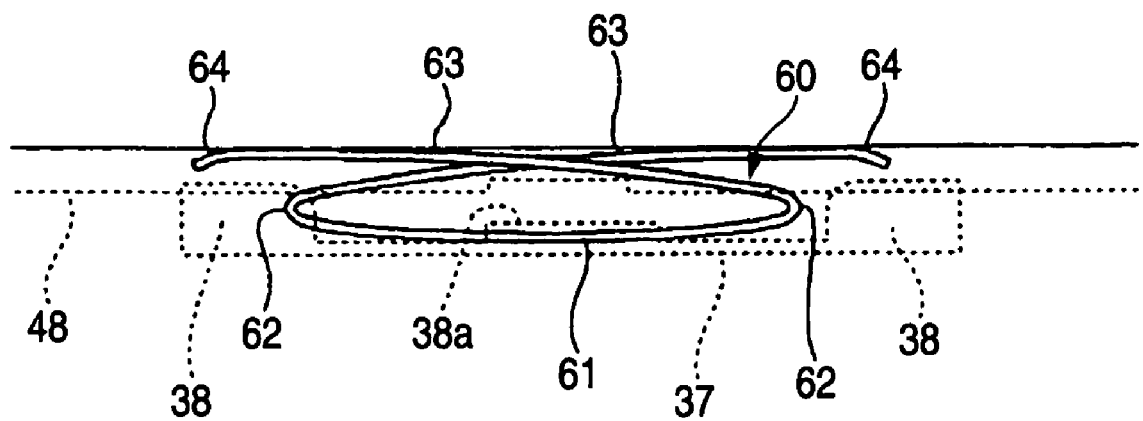
FIG. 12 is an explanatory view showing the spring of the comparative example when the sub-plate is pushed into the auxiliary visor.

FIGS. 11 and 12 show an example using a spring 60 with no features of the embodiment described above. The spring 60 is configured so that a center portion of a spring wire forms a base 61; that arm portions 63, which are continuous to the base 61 and bent obliquely upward at bent portions 62 so as to form an intersection portion 65; and that front ends 64 are retained at the arm-portion retention groove 48. In addition, the bent portions 62 of the base 61 are retained at the base retention grooves 38. The spring 50 of the embodiment described above is different from the spring 60 in that the center portion of the base 61 is not convex, but forms in a straight line, and that folded portions are not provided at the bent portions 62 while the arm portions 63 extend in a straight line from the bent portions 62.

When the sub-plate 40 is pushed into the auxiliary visor 30, and thus the spring 60 is compressed, the spring 60 is shaped like FIG. 12. That is, the base 61 is convex outward, so that the center portion of the base 61 touches the base retention grooves 38. In addition, the arm portions 63 are convex outward, so that the intermediate portions thereof touch the arm-portion retention groove 48. As a result, if the spring 60 is used, the urging force of the spring 60 varies considerably with the position of the sub-plate 40 with respect to the auxiliary visor 30. There is a possibility that the sub-plate 40 does not slide smoothly along the taper portion 45 of the sub-plate 40 toward the auxiliary visor 30 when the auxiliary visor 30 and the sub-plate 40 are pushed into the casing 17.

In the embodiment described above, the spring 50 has two features: that the spring 50 is convex toward the intersection portion 55 at the base 51; and that the folded portions 53 are provided at the bent portions 52, as shown in FIG. 7. However, if the spring 50 has any one of those features, the sub-plate 40 is pushed into the auxiliary visor 30 smoothly.

Hereinafter, the effects of the embodiment will be described.

When the auxiliary visor 30 and the sub-plate 40 are withdrawn from the sun-visor body 20, since the sub-plate 40 is pushed away in a direction perpendicular to the auxiliary visor 30, the light-shielding area increases. Thus the sun visor 10 can shield light, for example, sunlight or the like entering through the side window effectively.

In addition, the spring 50, which urges the sub-plate 40 in a withdrawing direction, is configured so that the center portion of the spring wire forms the base 51 and that the arm portion 54 cross each other. Therefore, the spring 50 can be received even in a small gap between the auxiliary visor 30 and the sub-plate 40. Also, the unfolded length of the spring wire can be increased to increase flexibility, and the arm portions 54 crossing each other can urge the sub-plate at two points. Therefore, the sub-plate 40 can be withdrawn smoothly.

Furthermore, the spring 50 is convex toward the intersection portion 55 at the center portion of the base 51 as described above. Therefore, the spring 50 touches the base retention grooves 38 only at the bent portions 52, which are the both ends of the base 51, even when the spring 50 is compressed. As a result, the fulcrums don't move. Furthermore, such a configuration is adopted that the spring wire is folded back a predetermined length toward the base 51 and then the arm portions 54 extend obliquely upward to cross each other. Therefore, the length of the arm portions 54 can be lengthen by the length of the spring wire folded back and diverted. Thereby, the flexibility of the spring 50 can be enhanced. Also, since the inclination of the arm portions 54 can be made acute, it can be prevented that intermediate portions of the arm portions 54 come into contact with the arm retention groove 48.

Furthermore, since the spring wire extends along the base 51 to a given length at the bent portions 52 of the spring 50 and then extends diagonally upward, forming the arm portions 54, so as to intersect each other, the length of the arm portions 54 can be increased as much as the length of the wire extended at the curve portions 53, thereby the pliability can be improved. Also, since the arm portions 54 can rise at a large angle, the arm portions 54 do not touch the arm retention groove 48 in the middle even when the spring 50 is bent.

Furthermore, since the front ends of the arm portions 54 of the spring 50 form the circular arc-shaped bent portions 56, which are convex away from the base 51, the arm portions 54 can be prevented from touching the arm-portion retention groove 48 even when the spring 50 is compressed.

Furthermore, since the bent portions 52 of the spring 50 and the circular arc-shaped bent portions 56 of the arm portions 54 are retained at the base retention grooves 38 and the arm-portion retention groove 48, respectively, the spring 50 does not escape and can be retained surely in the gap between the auxiliary visor 30 and the sub-plate 40.

Furthermore, the sun visor 10 includes the sun-visor body 20; the auxiliary visor 30 and the sub-plate 40, which are withdrawn from the sun-visor body 20. The sub-plate 40 slides in the direction perpendicular to the longitudinal direction of the auxiliary visor 30. Therefore, the light-shielding area is enlarged, and the sun visor 10 can shield sunlight entering through the side window 13 effectively.

According to another embodiment of the invention, the sun visor 10 may include the sun-visor body 20; the sub-plate 40, which is attached directly to the sun-visor body 20; and the spring 50, which is provided between the sun-visor body 20 and the sub-plate 40.

A sun visor of the invention mounted at a position being obliquely upward with respect to a driver's seat or a passenger seat of a vehicle includes a sub-plate in order to enlarge light-shielding area. Thereby, the sun visor can shield sunlight entering through a side window effectively, and is compact and lightweight.

What is claimed is:

1. A sun visor mounted at a position being obliquely upward with respect to a driver's seat or a passenger seat of vehicle, the sun visor comprising:

a sun-visor body pivotably supported by a vehicle body through a support member;

an auxiliary visor attached to the sun-visor body slidably;
a sub-plate attached to the auxiliary visor to slide between a first position where the auxiliary visor receives the sub-plate and a second position where the sub-plate is withdrawn from the auxiliary visor; and
a spring that urges the sub-plate toward the second position, the spring comprising a base and two arm portions continuous to the base, wherein:
the spring is formed of a spring wire,
a center portion of the spring wire forms the base of the spring,
the two arm portions are bent to cross each other,
a center portion of the base is convex toward an intersection of the two arm portions, and
the base of the spring abuts against one of the auxiliary visor and the sub-plate and the two arm portions of the spring abut against the other of the auxiliary visor and the sub-plate, to urge the sub-plate elastically.

2. The sun-visor according to claim 1, wherein a tip end of each of the two arm portions of the spring is bent in a circular-arc shape protruding away from the base.

3. The sun-visor according to claim 1, wherein:
the auxiliary visor defines a holding groove, with which the spring engages, at a portion where the spring abuts against the auxiliary visor, and
the sub-plate defines a holding groove, with which the spring engages, at a portion where the spring abuts against the sub-plate.

4. The sun-visor according to claim 1, wherein:
the auxiliary visor is attached to the sun-visor body so that the auxiliary visor can be withdrawn from one side of the sun-visor body in a withdrawing direction, and
when the auxiliary visor is withdrawn from the sun-visor body, the sub-plate is pushed out of the auxiliary visor in a direction substantially perpendicular to the withdrawing direction due to an urging force by the spring.

5. A sun visor mounted at a position being obliquely upward with respect to a driver's seat or a passenger seat of a vehicle, the sun visor comprising:
a sun-visor body pivotably supported by a vehicle body through a support member;
an auxiliary visor attached to the sun-visor body slidably,
a sub-plate attached to the auxiliary visor to slide between a first position where the auxiliary visor receives the sub-plate and a second position where the sub-plate is withdrawn from the auxiliary visor; and
a spring that urges the sub-plate toward the second position, the spring comprising a base and two arm portions continuous to the base, wherein:
the spring is formed of a spring wire,
a center portion of the spring wire forms the base of the spring,
the two arm portions are folded back toward the center portion of the spring wire, extends a predetermined distance along the base and then extends obliquely with respect to the base to cross each other, and
the base of the spring abuts against one of the auxiliary visor and the sub-plate and the two arm portions of the spring abut against the other of the auxiliary visor and the sub-plate, to urge the sub-plate elastically.

6. The sun-visor according to claim 5, wherein a tip end of each of the two arm portions of the spring is bent in circular-arc shape protruding away from the base.

7. The sun-visor according to claim 5, wherein:
the auxiliary visor defines a holding groove, with which the spring engages, at a portion where the spring abuts against the auxiliary visor, and
the sub-plate defines a holding groove, with which the spring engages, at a portion where the spring abuts against the sub-plate.

8. The sun-visor according to claim 5, wherein:
the auxiliary visor is attached to the sun-visor body so that the auxiliary visor can be withdrawn from one side of the sun-visor body in a withdrawing direction, and
when the auxiliary visor is withdrawn from the sun-visor body, the sub-plate is pushed out of the auxiliary visor in a direction substantially perpendicular to the withdrawing direction due to an urging force by the spring.

9. The sun-visor according to claim 6, wherein:
the auxiliary visor is attached to the sun-visor body so that the auxiliary visor can be withdrawn from one side of the sun-visor body in a withdrawing direction, and
when the auxiliary visor is withdrawn from the sun-visor body, the sub-plate is pushed out of the auxiliary visor in a direction substantially perpendicular to the withdrawing direction due to an urging force by the spring.

10. The sun-visor according to claim 7, wherein:
the auxiliary visor is attached to the sun-visor body so that the auxiliary visor can be withdrawn from one side of the sun-visor body in a withdrawing direction, and
when the auxiliary visor is withdrawn from the sun-visor body, the sub-plate is pushed out of the auxiliary visor in a direction substantially perpendicular to the withdrawing direction due to an urging force by the spring.

* * * * *